(12) United States Patent
Gagne et al.

(10) Patent No.: US 6,310,621 B1
(45) Date of Patent: Oct. 30, 2001

(54) EXTENDED SUPPORT FOR NUMERICAL CONTROLS

(75) Inventors: Rejean Gagne; Sylvain G. Moreau, both of Montreal; Jean-Claude Bouchard, Sainte-Adele, all of (CA)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/107,994

(22) Filed: Jun. 30, 1998

Related U.S. Application Data
(60) Provisional application No. 60/080,582, filed on Apr. 3, 1998.

(51) Int. Cl.⁷ .................................................. G06T 11/20
(52) U.S. Cl. .......................................... 345/440; 345/441
(58) Field of Search ................................... 345/440, 441, 345/433, 420

(56) References Cited

U.S. PATENT DOCUMENTS

| | | | |
|---|---|---|---|
| 4,694,407 | * | 9/1987 | Ogden .................................. 345/441 |
| 5,475,804 | * | 12/1995 | Bennett ................................ 345/439 |
| 5,774,130 | * | 6/1998 | Horikawa et al. .................... 345/441 |
| 5,802,535 | * | 9/1998 | Shibuta ................................ 707/523 |
| 5,949,434 | * | 9/1999 | Charlton .............................. 345/439 |
| 5,952,994 | * | 9/1999 | Ong et al. ............................ 345/127 |
| 5,966,139 | * | 10/2000 | Anupam et al. ..................... 345/440 |
| 6,133,914 | * | 10/2000 | Rogers et al. ....................... 345/334 |

OTHER PUBLICATIONS

"Plants, Fractals and Formal Languages", A. Smith, 7/98, Computer Graphics, vol. 18, No. 3 p. 1–10.*

* cited by examiner

*Primary Examiner*—Jeffery Brier
*Assistant Examiner*—Ryan Yang
(74) *Attorney, Agent, or Firm*—Lawrence E. Monks; Peter J. Gordon (57) ABSTRACT

A user-interface (UI) device allows the assignment of multiple parameter values to a multiple-selection of objects through a familiar UI mechanism. A multiple selection of objects is made. A object inspector is opened such as would normally be used to enter single values to be applied to properties of all the selected objects. For example, a group of graphical objects is selected and a line-weight parameter is adjusted to make the lines of the objects heavier. According to the invention, the same type of inspector device may be used to apply multiple values by providing for the indication of a function definition instead of an explicit value in a field normally used to enter a single value. The text boxes normally used for entry of values are provided with the ability to accept symbolic notation, e.g, a string, to indicate value ranges instead ofjust discrete values. The UI is programmed to parse the symbolic definition and generate values for each selected object so that each object receives a value of the selected parameter independently of the other objects. In an example, an indicator of a Gaussian probability function is entered as a string with a mean and variance to specify a range. The objects receive values pseudorandomly so that each may be assigned a different value for the parameter. This avoids the need to separately assign values to a large number of objects.

19 Claims, 4 Drawing Sheets

EXTENDED SUPPORT FOR NUMERICAL CONTROLS

This application claims priority to application Ser. No. 60/080,582 filed Apr. 3, 1998.

FIELD OF THE INVENTION

The invention relates to systems used for the editing of symbols on a computer through the modification of properties associated with the symbols. More narrowly, the invention relates to a user-interface that permits modification of such properties by selectively defining single or multiple values for the properties associated with a group of symbols, the interface automatically associating a respective one of the values to each symbol of the group.

BACKGROUND

Many computer programs display symbols according to specified properties identified with them. For example, typically, associated with the symbols, ASCII characters, in a word-processing file are one or more properties (formatting, font, typesetting) that determine how they appear on the screen and when printed. In graphic programs, vector-graphic objects may have geometric and non-geometric properties that determine how they appear when displayed. The user interface used to change such properties often permit selection of a symbol or group of symbols, for example by highlighting text, and the entry of a value for a parameter. For example, the font size of a set of characters in the word-processor may be modified by selecting the text and indicating, through the user-interface, the desired value for the font. To enter multiple values respective of each element of a group of symbols, each element must be selected in turn and a different value indicated for the parameter. For example, to make the font sizes of each character, of a group of characters, different, each character of the group must be separately selected and the font size separately adjusted for each through the user-interface.

In vector-based graphic programs, an author creates 3-dimensional scenes by defining objects with geometric and non-geometric properties. For example, the height, width, and depth dimensions or the surface reflectivity, color, or texture of primitive objects may be defined. This can be done by defining an association between a property (a collection or constellation of parameter values, also called, for example, a "style") and a certain group of objects or by associating specific property values with individual objects. All the objects belonging to the group associated with the property inherit the values defined in the property. A typical user-interface device for making changes in parameter values, for an individual object or for a defined property, may be called an inspector.

An inspector may have the appearance of a user interface control with fields for each parameter that may be adjusted. The author selects an object, group of objects, or a property (style) and opens the inspector. The inspector will typically show current values for the parameters. The inspector will usually show the parameters that have the same values in dark or regular font. Parameters that have different values for any two members of the group may be ghosted. The author can change the parameter values by selecting from lists, entering numbers in numeric fields, clicking on radio buttons, etc. If the value of a parameter that is ghosted is changed, the parameter value will be changed to the value entered for all objects to which that parameter applies. In other words, such an entry overrides the particular values for the heterogeneous selection set.

Note that it is known to permit the entry of a change to parameter values by entering an incremental value. So, for example, if a heterogeneous mix of objects is selected and an inspector invoked, the value "+2" can be entered for a parameter. The value of the parameter for each object will be incremented then, by two. The result is that each element of the group receives different values for the parameter.

Consider the creation of a group of objects in a vector-based graphics program. Suppose the author creates a group of duplicate prisms in a 3-D scene intended to represent a street scene. Each prism represents a building. The author desires to give the prisms varying dimensions to make the scene realistic. Initially, the artist may select all the buildings and call up an inspector for the objects or the author may, having previously associated the prisms with a style, call up a style-inspector. The author enters values of parameters that are desired to be identical for all the prisms. Then the artist must select each prism and separately adjust the dimensions of each using the object inspector. To save time, the author may define a number of separate styles and associate a random selection of prisms with each style. The different buildings would each have the properties of one of a set of styles, so each would not be unique. The more realistic look would be where each building's dimension is unique. At present, there is no convenient mechanism for associating different values with a group of objects, either directly or through a style definition, such that each object in the group receives different values for the properties.

SUMMARY OF THE INVENTION

A user interface provides an enhancement to the numerical controls that are used to establish parameter values for computer-stored symbols. The interface allows the entry of a range of values for selected parameters for a group of symbols. Each element of the group inherits a different value from the range according to an ordinal series, a random series, or some other association mechanism. The control allows the different elements of the group to receive different values from a range without specifying, symbol-by-symbol, the values to correspond to each symbol.

For example a group of prisms can be selected through the normal user interface of a graphic art authoring system. The system interface, as augmented by the invention, permits the entry of a range of values for a parameter, say height, and the specification of a type of distribution for the values in the range, for example a random distribution defined by a Gaussian probability density function (pdf). The interface will apply, by a pseudorandom process, different values for each of the selected objects according to the selected type of distribution. The result will be that each building will have a different height according to the pseudorandom sequence generated.

According to the invention, the user interface provides for the specification of a value range. In addition, the interface may provide for the identification of a type of range to be applied. For example, a pseudo-random distribution characterized by a Gaussian could be specified by providing a range and an identifier indicating that a Gaussian distribution is desired. The values indicating the range in that case could be identified as a mean and variance. (For each type of distribution, a numerical format may be established to allow the symbols to be parsed and the desired operation to be performed.) Alternatively, a group of discrete values may be entered along with a token that indicates that random selections are to be made from the entered group of values and assigned sequentially to the selected symbols. Many alternatives are possible, the essential ingredient being that the functionality of a specification in an inspector that is normally associated with fixed values is expanded to accommodate value ranges. The group of objects are identified not with a specific value but with a range of values.

Where pseudo-random number generators are used to generate the distribution of values associated with each object, the sequences can be preserved by storing the seed used to generate pseudo-random random sequence. If a particular pseudorandom sequence does not provide a desired look (for example, the variation in prism-building-height is not aesthetically pleasing or has an unnatural look), it can be changed by either manually or automatically changing the seed. Once a distribution with a desirable look is obtained, the corresponding set of values can then be preserved automatically by simply storing the seed. A set of different predefined seeds may be stored in the computer and invoked using a token in the range definition.

In a specific embodiment, the invention may be applied in a 3-D animation authoring system. An author selects a group of objects and calls an object inspector. The object inspector provides a form for the entry of values for each of the definable parameter values for the group. The user can enter a specific value for a parameter. In that case, the inspector behaves as in the prior art. That is, entry of single values for parameters results in all applicable objects (either through the mechanism of a style definition, directly through a current selection of a group) receiving the same value for the adjusted parameters. Alternatively, the user can, for the same parameter or parameters, enter or identify a range of values and, perhaps some other data indicating options such as the type of range. The result is that each element of the group receives different values for the parameter.

Various types of value-ranges can be used with the invention. For example, the following kinds of ranges could be used: evenly-spaced values, random distribution with flat pdt random distribution with normal pdf logarithmically-spaced values, a numerical function whose output is applied to the elements of the group, random distributions with an impulse response filter applied to smooth radical differences between adjacent elements of the group. The preceding are only examples of ranges. The invention may be applied to many kinds of numerical or other types of ranges. In the animation example, suppose that the author has created 100 prisms to represent buildings in a city. The "buildings" may be placed along streets. Using the invention, the author can easily scale the height dimension of each building about its respective base to give the street scene a natural appearance. The invention makes the task of distributing scale values over the elements of the group of buildings relatively straightforward. In fact, assuming a default random treatment is provided, only a range of values need be specified to scale the entire set of buildings.

When an inspector is opened, the parameters that have been identified with a range of values may show the original definition or a particular pseudorandom sequence that has been generated and preserved. Alternatively, the parameters identified with a range of values may be ghosted or treated as a parameter for which at least two objects have different values. In the latter case, the operation of entering a range of values associates a particular value for each object such that when any particular object is selected, the inspector shows the value given in the distribution-value assignment. Thus, there are at least two ways to implement the enhanced value-range device of the invention, one, where the objects selected inherit values at the time the range is entered and each receives a single value after the operation is complete (e.g., the inspector is closed). The other is where the objects in the group retain their range-value status. Note that in either case, a new range of values can be implemented so that, if an author becomes dissatisfied with a particular outcome (e.g., the author selected a random distribution and later decides a Gaussian would be more appropriate), a new range can be entered easily.

In animation software, parameters could include animation effects such as velocity, variations in the look of objects, for example, dinosaurs running in a field. This variation is essential to a realistic result.

Note that to implement the invention, the user-interface of graphics software may not require substantial modification. The object inspectors of existing programs need only be modified to the extent required to enable multiple numeric values (to characterize the range) and, perhaps, one or more tokens (to characterize the type of range, e.g., Gaussian, linear range, etc.) to be entered. In addition, by providing the functionality through the familiar type of human interface, the functionality provided can be readily learned and implemented by artists.

According to an embodiment, the invention is a method for assigning parameter values to symbols stored in a computer. One step is identifying a group of symbols each having a parameter with a selectable value. Another step is receiving an input that defines a group of values for the parameter. Another step is applying the group of values to the group of symbols such that the parameter of at least two of the symbols have different values as a result of the step of applying. The step of receiving may include invoking a parameter data entry form with fields for entry of numeric data. The fields may be such that entry of a single value in a field corresponding to the parameter causes all of the symbols of the group of symbols to be assigned the single value. That is, the data entry form may accept single values and the single value would be assigned to each selected object. The fields may also be such that entry of a multiple-value symbol in the field causes at least two of the symbols of the group of symbols to be assigned different values defined by the multiple-value symbol. The symbols may be graphical objects or animation sequences. The step of identifying may include selecting a group of symbols through a user-interface. The step of identifying may include displaying each of the symbols and selecting the group symbols by making a multiple selection. The step of receiving may include entering a string in a field of the data entry form where the string specifies the multiple-value symbol.

Another embodiment of the invention is a method for a computer user-interface that provides a selection mechanism for multiple-selection of symbols. The interface provides a parameter adjustment mechanism associated with the selection mechanism that accepts a value for a parameter associated with the symbols. It assigns a single value of the parameter to each object in the multiple-selection when a single value is accepted. The invention provides a method of using this same type of interface to allow the entering of multiple values for the parameter such that different values are applied to each symbol of the multiple-selected symbols. The steps begin with making a multiple selection of symbols to indicate multiple-selected symbols. Another step is accepting in the parameter adjustment mechanism an indicator of multiple values. The indicator is parsed into a mathematical function that generates multiple values and the multiple values are assigned respectively to each of the multiple-selected symbols. The parameter adjustment mechanism may include a data input form in which a string is typed, the string being parsable into a mathematical expression or some other mechanism for generating multiple values. The result of the assigning step may include replacing a current value of the parameter for each of the multiple-selected symbols with the respective multiple value. The indicator may indicate a statistical function operable over a range of values and may include a seed for a random function generator. The assignment would then involve generating the pseudorandom values responsively to the seed.

Another embodiment of the invention provides a method for assigning values, through a user-interface of a computer, to a parameter of each of objects, stored in a memory of the computer, comprising the steps of: (1) making a multiple selection of the objects; (2) displaying a user interface control with an input field for entering a value of a parameter of each of the objects, the step of displaying being responsive to the step of making a multiple selection; (3) entering a symbol in the field, the symbol indicating a value-generating function; and (4) evaluating the value-generating function iteratively and for each value thereby generated, assigning the each value to a respective one of the objects. The method may include the step of selecting at least one object, displaying the user interface control, entering a single numerical value in the input field, and assigning the single numerical value to the parameter of the at least one object. Also, the value-generating function can include a seed for use in a pseudorandom number generator and the step of evaluating includes generating pseudorandom numbers responsively to the seed. The value-generating function may include an indicator of a predefined seed stored with other seeds in the computer, the seeds being for use in a pseudorandom number generator and the step of evaluating can include generating pseudorandom numbers responsively to the indicator of the predefined seed.

DETAILED DESCRIPTION OF THE PREFERRED EMBODIMENTS

Figure 1:
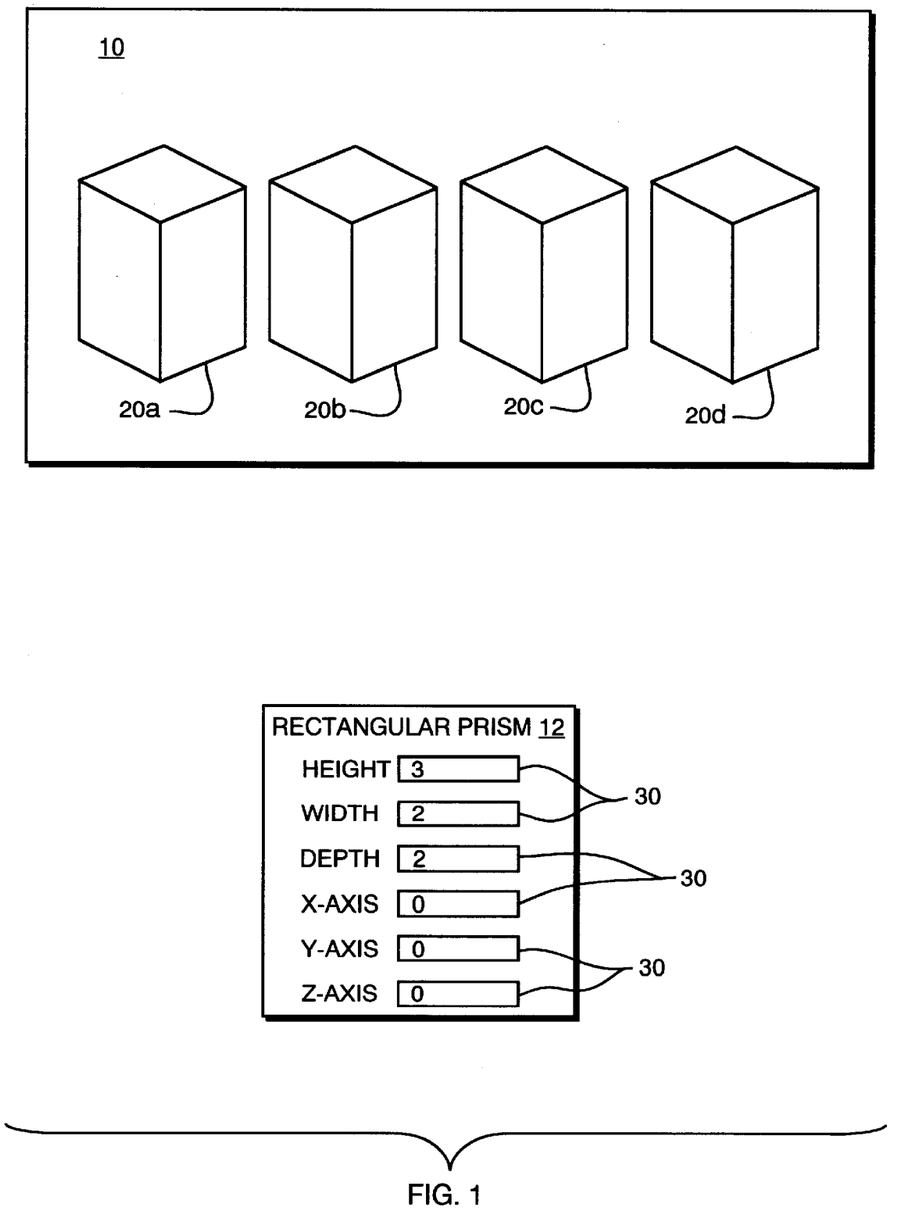
FIG. 1 shows a multiple selection of objects and a parameter inspector at a time when identical values for parameters are being applied to all of the selected objects.
Figure 1A:
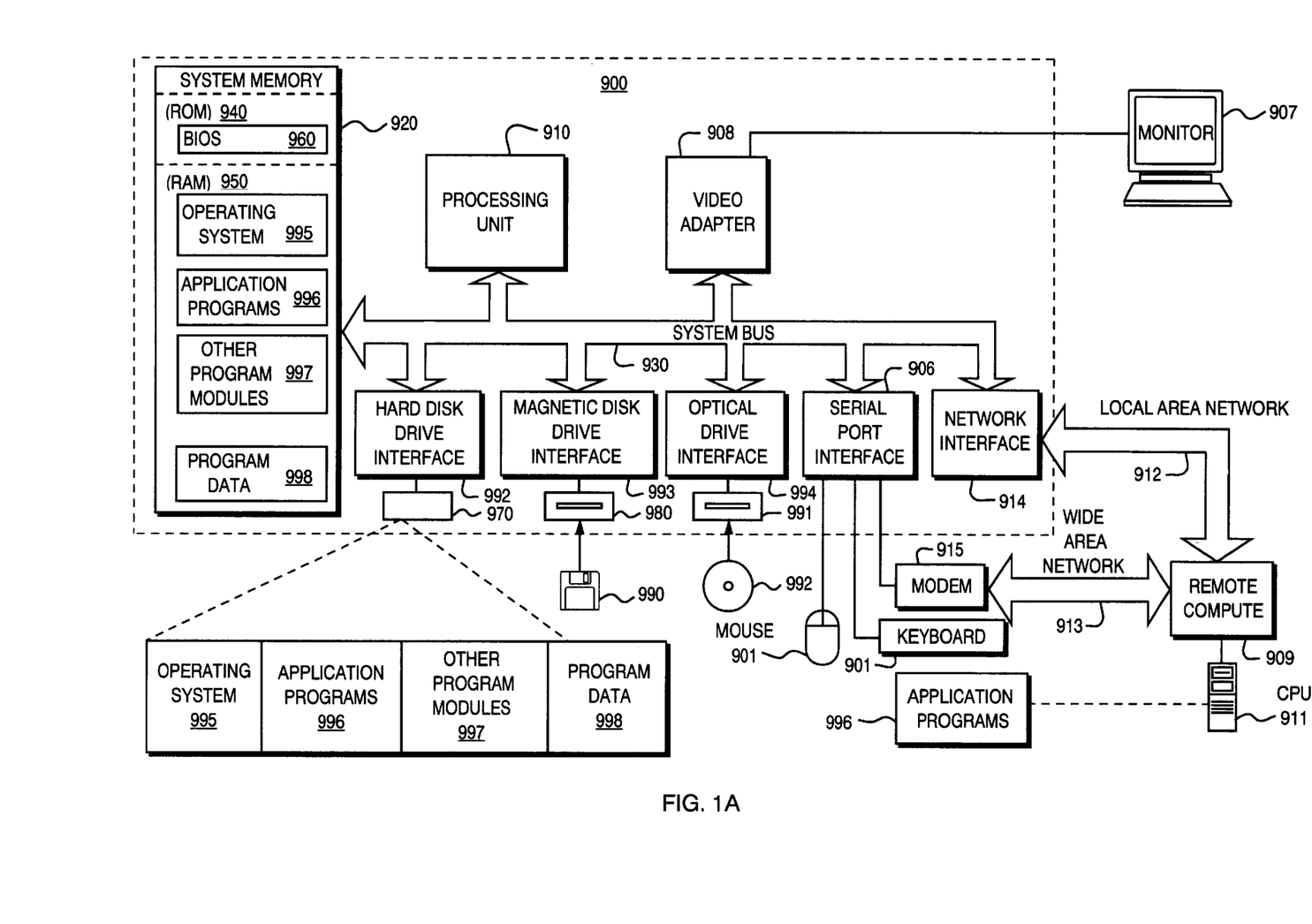
FIG. 1A illustrates a conventional computer system according to the prior art.

Referring to FIG. 1A, a suitable computing environment in which the invention may be implemented, with various computer system configurations such as the one depicted. Note that the invention may be practiced in distributed computing environments, where tasks are performed by remote processing devices linked through a communications network with program modules located in local and/or remote storage devices. An exemplary system includes a conventional personal computer 900, with a processing unit 910, a system memory 920, and a system bus 930 interconnecting system components, including the system memory to the processing unit 910. The system bus 930 may be any structure including a memory bus or a memory controller, a peripheral bus, or a local bus. The system memory includes read only memory (ROM) 940 and a random access memory (RAM) 950. A basic input/output system 960 (BIOS), containing the basic routines that helps to transfer information between elements within the personal computer 900, such as during start-up, is stored in ROM 940. The personal computer 900 further includes a hard disk drive 970, a magnetic (e.g., floppy) disk drive 980 with a removable magnetic disk 990, and an optical disk drive 991 with a removable optical disk 992. The hard disk drive 970, magnetic disk drive 980, and optical disk drive 991 are connected to the system bus 930 by a hard disk drive interface 992, a magnetic disk drive interface 993, and an optical disk drive interface 994, respectively. Other types of computer readable media may be used to store data as well, such as magnetic cassettes, flash memory cards, digital video disks, Bernoulli cartridges, random access memories (RAMs), read only memories (ROMs), and the like.

Program modules may be stored on the hard disk, magnetic disk 990, optical disk 992, ROM 940 or RAM 950, including an operating system 950, one or more application programs 996, other program modules 997, and program data 998. A user may enter commands and information into the personal computer 900 through input devices such as a keyboard 901 and a pointing device 901. Other input devices (not Shown) may include a microphone, joystick, game pad, satellite dish, scanner, or the like. These and other input devices are often connected to the processing unit 910 through a serial port interface 46 that is coupled to the system bus, but may be connected by other interfaces, such as a parallel port, game port or a universal serial bus (USB). A monitor 907 or other type of display device is also connected to the system bus 930 via an interface, such as a video adapter 908. In addition to the monitor, personal computers typically include other peripheral output devices (not shown), such as speakers and printers.

The personal computer 900 may operate in a networked environment using logical connections to one or more remote computers, such as a remote computer 909. The remote computer 909 may be another personal computer, a server, a router, a network PC, a peer device or other common network node, and typically includes many or all of the elements described above relative to the personal computer 900, although only a CPU 911 has been illustrated in FIG. 1. The logical connections depicted in FIG. 1 include a local area network (LAN) 912 and a wide area network (WAN) 913. Such networking environments are commonplace in offices, enterprise-wide computer networks, intranets and the Internet.

When used in a LAN networking environment, the personal computer 900 is connected to the local network 912 through a network interface or adapter 914. When used in a WAN networking environment, the personal computer 20 typically includes a modem 915 or other means for establishing communications over the wide area network 913, such as the Internet. The modem 915 is connected to the system bus 930 via the serial port interface 906. In a networked environment, program modules, or portions thereof, may be stored in the remote memory storage device. It will be appreciated that the network connections shown are exemplary and other means of establishing a communications link between the computers may be used.

As is familiar to those skilled in the art, the computer system 900 further includes an operating system and at least one application program. The operating system controls the computer system's operation and the allocation of resources. The application program is a set of software that performs a task desired by the user, making use of computer resources made available through the operating system. Both may be resident in the illustrated memory 920 or in another store as suggested above.

In accordance with the practices of persons skilled in the art of computer programming, the invention may be described with reference to acts and symbolic representations of operations that are performed by the computer system 900, unless indicated otherwise. Such acts and operations are sometimes referred to as being computer-executed. It will be appreciated that the acts and symbolically represented operations include the manipulation by the CPU 910 of electrical signals representing data bits which causes a resulting transformation or reduction of the electrical signal representation, and the maintenance of data bits at memory locations in the memory system 22 to thereby reconfigure or otherwise alter the computer system's operation, as well as other processing of signals. The memory locations where data bits are maintained are physical locations that have particular electrical, magnetic, optical, or organic properties corresponding to the data bits.

In an illustrative embodiment of the invention, the computer system 20 may use the Windows NT®, Windows 95®, or Windows 98® client server operating system. Other client/server operating systems (e.g. O/S2 by IBM, Mac OS, UNIX, Windows CE, etc.) can also be used. A client/server operating system is an operating system which is divided into multiple processes of two different types: server processes, each of which typically implements a single set of services, and client processes, which request a variety of services from the service processes. Object oriented programming is used to design the client/server operating system, and applications which run under the client/ operating system, where objects represent system resources.

For example, the Windows 95 client/server operating system provides shareable resources, such as files, memory, processes and threads, which are implemented as "objects" and may be accessed by using "object services." As is well known in the art, an "object" is a data structure whose physical format is hidden behind a type definition. Data structures, also referred to as records or formats, are organization schemes applied to data so that it can be interpreted, and so that specific operations can be performed on that data. Such data structures impose a physical organization on the collection of data stored within the computer memory 920 and represent specific electrical, magnetic or organic elements.

An "object type," also called an "object class," comprises a data-type, services that operate in instances of the data type, and a set of object attributes. An "object attribute" is a field of data in an object that partially defines that object's state. An "object service" implements and manipulates objects, usually by reading or changing the object attributes. "Object oriented design" is a software development technique in which a system or component is expressed using objects.

An object typically has two components: a function table, containing a pointer to each object member function (i.e., sometimes known as an object method) defined in the object's class, and a data block, containing the current values for each object variable (i.e., data members, sometimes known as an object property). An application has some reference to an object through the object pointer. An application obtains this object reference by using some type of function call (direct or implied) in which that function allocates an object block in computer memory, initializes the function table, and returns the reference to the computer memory to an application. The computer memory may be local or distributed on a remote computer.

The Windows 95 operating system allows users to execute more than one program at a time by organizing the many tasks that it must perform into "processes." The operating system allocates a portion of the computer's resources to each process and ensures that each process's program is dispatched for execution at the appropriate time and in the appropriate order.

In an illustrative embodiment of the invention, processes are implemented as objects. A process object comprises the following elements: an executable program; a private address space; system resources (e.g., communication ports and files) that the operating system allocates to the process as the program executes; and at least one "thread of execution." A "thread" is the entity within a process that the operating system kernel schedules for execution. As is well known in the art, each thread has an associated "context" which is the volatile data associated with the execution of the thread. A thread's context includes the contents of system registers and the virtual address belonging to the threads process. Thus, the actual data comprising a threads context varies as it executes.

Referring to FIG. 1, a user interface includes a window showing a rendering of a 3-D scene. Four prism objects are defined in the scene 20a–20d. Also shown in a window is an inspector 12 used to define values for parameters of the objects 20a–20d. In the embodiment, it is assumed that the prism objects are predefined to be rectangular in shape and the inspector allows changes to the height, width, depth dimensions and three angular orientations, one each for the x, y, and z axes. Respective data entry fields 30 are provided in the inspector. The illustration is only for purposes of illustration and more realistic examples would be more complex than required to describe the invention.

The rendering could be a realistic rendering as depicted, for example, according to a copending U.S. Patent Application entitled "A System for Editing Complex Visual Data Providing a Continuously Updated Rendering," the entirety of which is incorporated herein by reference. The rendering could be an abstracted rendering such as a wire-frame. (The incorporated application provides a realistic rendering in the authoring environment itself.) In the embodiment shown in FIG. 1, the rendering is shown in a window 10.

As illustrated in FIG. 1, all of the objects have been provided single values in each numeric field. It is assumed that all four objects 20a–20d have been selected by some selection tool such as a rubber band box. Thus, all objects are displayed according to the same set of parameter values. If two objects in the selection group had different values of; say, width, the width box 30 may be ghosted to indicate that not all members of the group had the same value. If a value is typed into a ghosted field, the varying values are overriden and all take on the same value. Alternatively an incremental value may be entered as discussed above and all values in the heterogeneous set will be incrementally modified accordingly.

Figure 2:
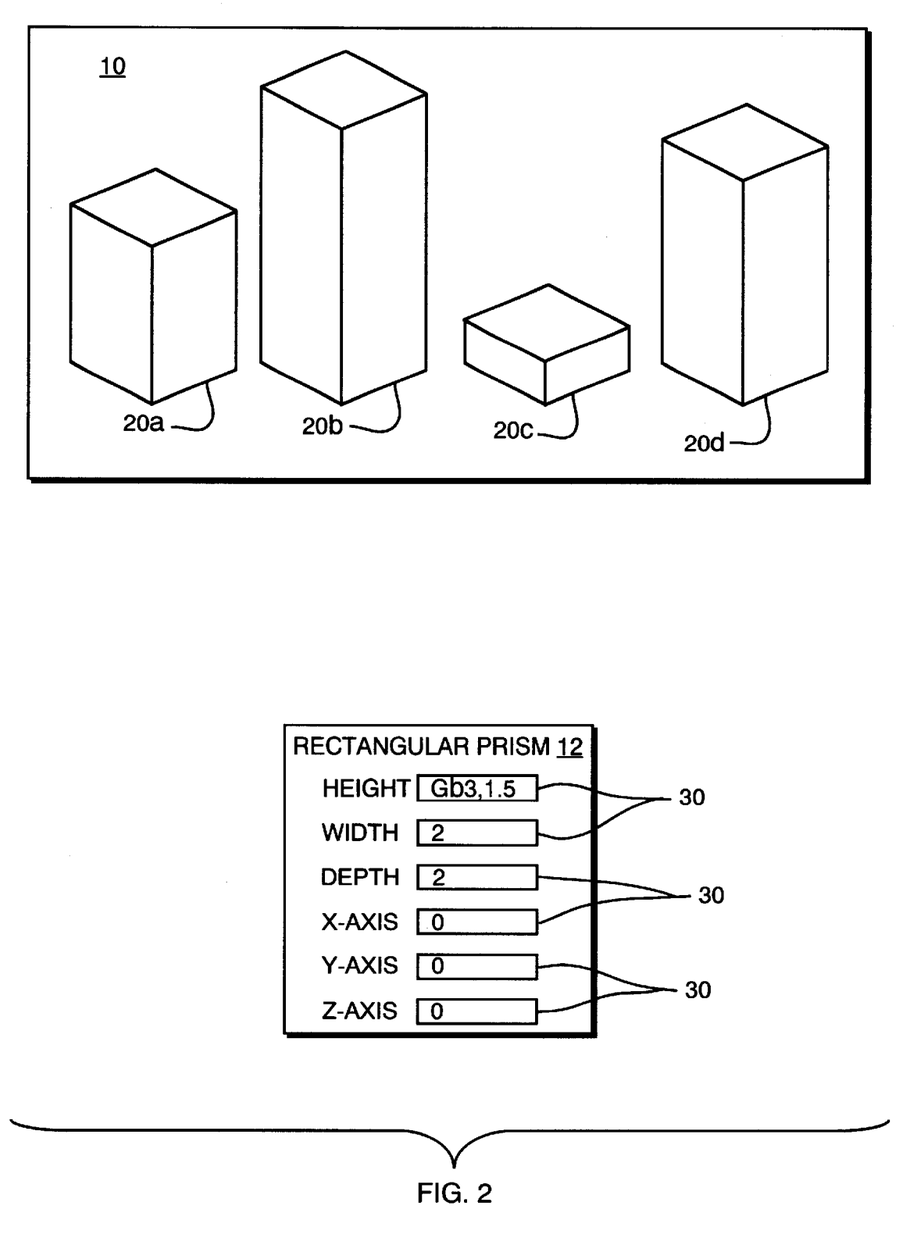
FIG. 2 shows the multiple selection and inspector of FIG. 1 at a time when various of one parameter have been applied through a range definition according to an embodiment of the invention.

Referring to FIG. 2, the same user-interface as that of FIG. 1 is shown. However, in FIG. 2, a range value has been entered into the inspector. The notation, in this example, may be interpreted by the computer to indicate a Gaussian distribution with a mean of 3 and a variance of 1.5. FIG. 2 shows the effect of the change entered into the inspector 12. The rendering in the render window 10 has been modified to reflect that the objects are now assigned heights randomly according to a Gaussian curve. The syntax of the expression used to enter the range of values in the height field includes a letter, G, to identify the type of range, a Gaussian. The syntax also includes numbers to specify the mean and variance to be applied.

The syntax of the height-field entry also includes a letter, b, that identifies a particular pseudorandom seed is to be used. This means that the author can specify a particular Gaussian distribution that is derived by applying a pseudorandom number generator using a particular value of the seed. By selecting the seed value, the author selects a particular set of values that will be used in rendering the objects 29–20d. As is known, pseudorandom number generators only appear to generate random numbers. Their behavior is deterministic. In addition, for a given seed value, the generator's output may always be identical. According to the invention, the author may preserve a particular distribution of values by saving a seed value under a label. In this case, the author saved a particular seed value in a memory slot labeled "b."

Figure 3:
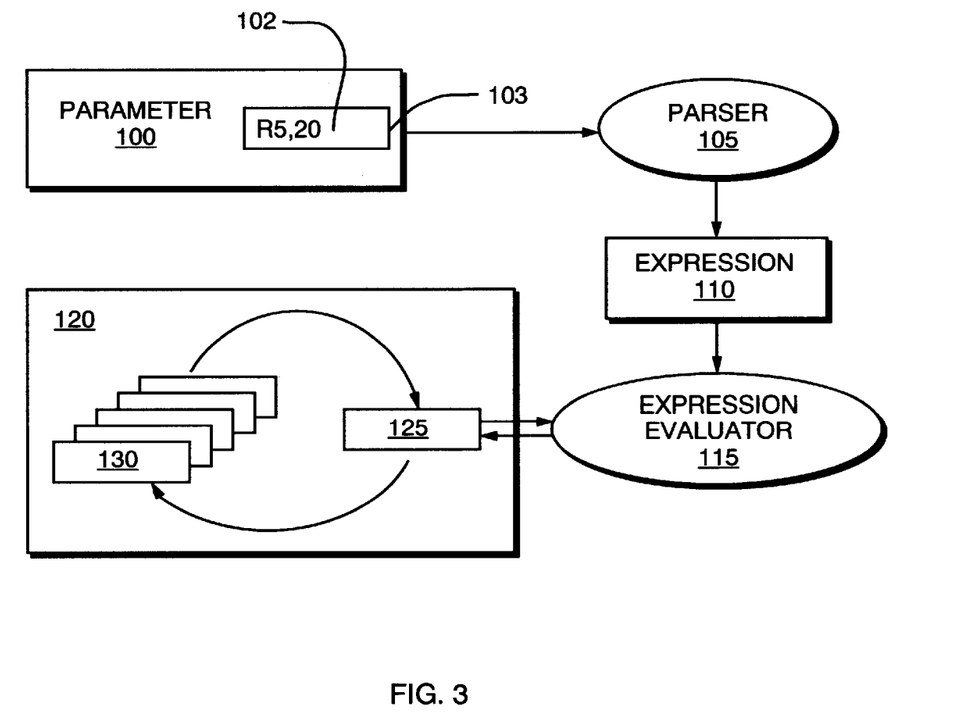
FIG. 3 illustrates steps in assigning multiple values to a multiple selection of objects according to an embodiment of the invention.

Referring to FIG. 3, the invention may be implemented according to a sequence of steps beginning with the entry of a range definition, according to one possible syntax, into an inspector 100. The range definition is entered by typing a string into a field 103 provided in the inspector. The range definition identifies a range of values for a parameter. In the example shown, a range of random values is assigned beginning with the value 5 and ending with the value 20. The inspector may represent many values for numeric and nonnumeric parameters. In the situation illustrated, a group of objects 130 is selected (for example, the selection may be made by defining a rubber band box around a group of wire-frame renderings in a view), the inspector 100 opened, and the range definition 102 entered.

Whether the string typed in field 103 has any special characters, such as those identifying a range definition, the field has to be parsed. A parser 105 turns the string into an expression 110. The expression 110 is a binary tree that can be evaluated by a computer. This kind of expression-parsing is well known and the details need not be articulated. For just an example, the expression R5,20 could be transformed into a function that can be written as RAND(seed, min, max) where seed is the value of a default seed value (as discussed elsewhere in this specification, the seed value could be identified by a letter or some other symbol or number). The min and max values are the values 5 and 20 respectively. The RAND function may be implemented using a more basic random function provided in a standard development kit, for example which may provide a random value between 0 and 1, which must be mapped into the appropriate range. The expression 110 is applied to an expression evaluator 115 that evaluates it.

Now a property page handler 120 is triggered to process the user input. It loops through all objects in the multiple selection 130. For each item, the expression may be evaluated and the resulting value used to set the parameter for each object 125. If the expression contains a random function, as in the example, the expression evaluator 115 will return a different value for each object in the multiple selection 130.

Once all the objects in the multiple selection 130 are processed, an inspector redraw operation may be performed that displays all current values that apply to the selection 130. Since the values of the parameter defined as a range no longer has a single value, the way it the field is displayed may depend on the implementation. In the example discussed in FIG. 3, the field may be ghosted or blanked to indicate that there are different values for the different objects.

In an alternative embodiment, the range definition is associated with the group along with the seed and that association is preserved explicitly rather than by applying the particular values to the objects when the association is formed. That is, the association is made every time the objects are rendered. The range and seed are an attribute of the group. Thus, for example, where a range definition was associated an object, instead of storing a value for the parameter, the system might, for example, store a special index-value and a symbol to indicate it is a range definition. All appropriate information necessary to assign values to the objects of the selection group may be stored in an indexed file to which the index-value points. This information includes the multiple selection, the range definition, the parameter identified with the range, the seed, etc. Whenever the objects are rendered, the operation shown in FIG. 3 may be performed and values given to the appropriate parameters for purposes of rendering. Thus, in this embodiment, the assignment of actual values is not made except on the fly when required to actually render the objects. In other words, instead of associating a parameter value for each object in a group, a range is associated with the group and the values derived as needed. In effect, it may amount to the same thing in terms of the object behavior since the pseudorandom sequence may be preserved by a seed.

The invention may be implemented to provide for various different types of distributions. For example, the following distributions may be defined:

Random: Each value is randomly (or pseudorandomly) generated according to a flat probability density function. Every value in the range has an equal probability of being assigned to an object.

Gaussian: Objects are according to the Gaussian probability distribution. That is, the probability that a value will be assigned to an object is correlated to a Gaussian curve so that, for example, values in the middle of a range are more likely to be chosen than values at the tails of the range.

Linear List: Each value is set such that the first value corresponds to the minimum of the range and the last value to the maximum of the range. Between the two, the values are equally spaced. This assumes the group is specified in some ordinal sequence so there is a first object defined which receives the minimum value and a last object that receives the maximum value.

Linear Staggered List: An equally spaced distribution may be applied with no ordering in the list of objects so that each element of the group gets a value from a list of equally-spaced values but which object gets which value is randomly determined.

Normal Spread List: Values are sequentially spread according to a normal distribution (Gaussian curve). This assumes the group is specified in some ordinal sequence so there is a first object defined which receives the minimum value and a last object that receives the maximum value. A result of this application would be that more objects in a group would receive values closer to the "mean" of the curve and fewer would receive values closer to the "tails" of the curve.

Normal Spread Staggered List: Values are sequentially spread according to a normal distribution (Gaussian curve). This does not assume the group is specified in some ordinal sequence A result of this application would be that more objects in a group would receive values closer to the "mean" of the curve and fewer would receive values closer to the "tails" of the curve. A reason for providing this, as an alternative to a Gaussian distribution, is that a small number of objects may look more distributed over a range of values if the values are assigned in an equally distributed fashion. Random assignment could result in all elements of a small group receiving values on one side of the "mean," for example.

Random Assignment from a List: A list of values could be entered in the inspector or stored somewhere and identified with a token. Assignment of values could be made randomly from the set defined by the list.

Other examples are logarithmically spaced sequences, pseudorandom sequences to which an impulse filter is applied to smooth the variation from one object to the next (called 'coherent noise' and assumes an ordered list of objects), and a staggered or ordered list derived from a specified function, for example, a polynomial.

Another example of how the invention may be applied is in the context of animation. Suppose the author wishes to produce an animation sequence showing a thousand 3-D characters in a stadium clapping. The animator applies to each of the characters a single cycle of animation such that the character's hands clap once. Note that it is likely the animator will create several instances of the characters and the animation. That is, there will be a thousand slave copies a master character with its animation.

To animate the characters, the animator uses a time control property on each character. A time control property allows one to modify the speed, start time, end time and cycling characteristics of an animation without changing the underlying animation data. To obtain a realistic crowd scene, the bulk of the crowd should clap hands, say, 50 times while some clap more and some fewer. Some will start sooner and some later. This example is appropriate for the Gaussian random distribution. Considering a clap cycle duration of 5 frames, getting a proper crowd animation is just a matter of applying a multirandom entry for the beginning frame of the animation and another one for the number of cycles the animation will be performed. For example, following the syntax described above, G30,10 could be entered for the start time so that most people will start clapping 30 frames (the mean being 30).

What is claimed is:

1. A method for assigning parameter values to symbols stored in a computer, comprising the steps of:
   identifying a group of symbols each having a parameter with a selectable value;
   receiving an input that defines a multiple-value symbol, said multiple-value symbol including a string specifying values for said parameter;
   applying said multiple-value symbol to said group of symbols such that said parameter of at least two of said symbols have different values as a result of said step of applying.

2. A method as in claim 1, wherein said step of receiving includes invoking a parameter data entry form with fields for entry of numeric data, said fields being such that entry of a single value in a field corresponding to said parameter causes all of said symbols of said group of symbols to be assigned said single value and such that entry of a multiple-value symbol in said field causes at least two of said symbols of said group of symbols to be assigned different values defined by said multiple-value symbol.

3. A method as in claim 1, wherein said symbols are graphical objects.

4. A method as in claim 1, wherein said symbols are animation sequences.

5. A method as in claim 1, wherein step of identifying includes selecting a group of symbols through a user-interface.

6. A method as in claim 1, wherein said step of identifying includes displaying each of said symbols and selecting said group symbols by making a multiple selection.

7. A method as in claim 6, wherein said step of receiving includes invoking a parameter data entry form with fields for entry of numeric data, said fields being such that entry of a single value in a field corresponding to said parameter causes all of said symbols of said group of symbols to be assigned said single value and such that entry of a multiple-value symbol in said field causes at least two of said symbols of said group of symbols to be assigned different values defined by said multiple-value symbol.

8. In a computer user-interface that provides a selection mechanism for multiple-selection of symbols, a parameter adjustment mechanism operatively associated with said selection mechanism that accepts a value for a parameter associated with said symbols, and assigns a single value of said parameter to each of multiple-selected symbols when a single value is accepted, a method for entering multiple values for said parameter such that different values are applied to each symbol of the multiple-selected symbols, comprising the steps of:
   making a multiple selection of symbols, whereby multiple-selected symbols are indicated;
   accepting in said parameter adjustment mechanism an indicator, indicative of a string of multiple of values;
   parsing said indicator into a mathematical function that generates multiple values of values;
   assigning a different one of said multiple values to each of said multiple-selected symbols.

9. A method as in claim 8, wherein said parameter adjustment mechanism is a data input form.

10. A method as in claim 8 wherein said step of making a multiple selection includes displaying said symbols.

11. A method as in claim 8 wherein said step of assigning includes replacing a current value of said parameter for each of said multiple-selected symbols with said different one of said multiple values.

12. A method as in claim 8, wherein said step of accepting includes accepting in said parameter adjustment mechanism, an indicator of a range of values, said multiple values being defined by said indicator of a range.

13. A method as in claim 8, wherein said step of accepting includes accepting in said parameter adjustment mechanism, an indicator of a statistical function operable over a range of values, said multiple values being defined by said indicator of a statistical function.

14. A method as in claim 13, wherein said statistical function is a definition of a Gaussian probability density function and said step of assigning includes generating pseudorandom values.

15. A method as in claim 14, wherein said indicator includes an indication of a seed for a random function generator, said step of assigning includes generating said pseudorandom values responsively to said seed.

16. A method for assigning values, through a user-interface of a computer, to a parameter of each of objects, stored in a memory of said computer, comprising the steps of:
   making a multiple selection of said objects;
   displaying a user-interface control with an input field for entering a value of a parameter of each of said objects, said step of displaying being responsive to said step of making a multiple selection;
   entering a symbol in said field, said symbol indicating a value-generating function for generating a string of values;

evaluating said value-generating function iteratively and for each value thereby generated, assigning said each value to a respective one of said objects.

17. A method as in claim 16, further comprising the step of selecting at least one object, displaying said user interface control, entering a single numerical value in said input field, and assigning said single numerical value to said parameter of said at least one object.

18. A method as in claim 16, wherein said value-generating function includes a seed for use in a pseudorandom number generator and said step of evaluating includes generating pseudorandom numbers responsively to said seed.

19. A method as in claim 16, wherein said value-generating function includes an indicator of a predefined seed stored with other seeds in said computer, said seeds being for use in a pseudorandom number generator and said step of evaluating includes generating pseudorandom numbers responsively to said indicator of said predefined seed.

* * * * *